United States Patent [19]

Huizinga et al.

[11] Patent Number: 5,006,496
[45] Date of Patent: Apr. 9, 1991

[54] PROCESS FOR THE PREPARATION OF ZEOLITIC CATALYSTS

[75] Inventors: Tom Huizinga; Arend Hoek; Hennie Schaper; Aan H. Klazinga, all of Amsterdam, Netherlands

[73] Assignee: Shell Oil Company, Houston, Tex.

[21] Appl. No.: 376,277

[22] Filed: Jun. 16, 1989

[30] Foreign Application Priority Data

Jun. 20, 1988 [GB] United Kingdom ............... 8814601

[51] Int. Cl.$^5$ .............................................. B01J 29/10
[52] U.S. Cl. ........................................ 502/61; 502/66; 502/74
[58] Field of Search ................. 502/60, 61, 64, 65, 502/66, 79

[56] References Cited

U.S. PATENT DOCUMENTS

| 3,364,135 | 1/1968 | Hansford | 502/79 |
| 3,376,215 | 4/1968 | Bertolacini et al. | 502/66 |
| 3,455,842 | 7/1969 | Cornelius et al. | 502/66 |
| 3,706,694 | 12/1972 | Young | 502/65 |
| 3,853,747 | 12/1974 | Young | 208/111 |
| 4,415,439 | 11/1983 | Chiang | 208/120 |
| 4,487,843 | 12/1986 | Telford et al. | 502/85 |

FOREIGN PATENT DOCUMENTS

| 050021 | 4/1982 | European Pat. Off. |
| 169026 | 1/1986 | European Pat. Off. |
| 0247679 | 5/1987 | European Pat. Off. |
| 247678 | 12/1987 | European Pat. Off. |

*Primary Examiner*—Carl F. Dees

[57] ABSTRACT

Process for the preparation of a zeolitic catalyst which comprises treating a zeolite of the Y-type having an alkali oxide/aluminum oxide molar ratio of at most 0.13 with a solution of a multi-valent metal salt having a cationic radius between 0.6 and 1.0 Å and combining the ion-exchanged zeolite without a calcination step with a hydrogenation component of a Group VIII and/or Group VI(b) metal.

6 Claims, No Drawings

PROCESS FOR THE PREPARATION OF ZEOLITIC CATALYSTS

FIELD OF THE INVENTION

The present invention relates to a process for the preparation of zeolitic catalysts, catalyst thus prepared and use thereof in hydroconversion processes, in particular hydrocracking processes.

BACKGROUND OF THE INVENTION

The use of zeolites as catalysts and/or catalyst carriers has long been recognized and many methods to improve zeolitic base materials have been reported in the art. In zeolite research and development much attention has been devoted to physically changing the nature and possibly the properties of zeolite base materials, e.g. by calcining, calcining under so-called self-steaming conditions or by wet calcination. Also the treatment with ammonium-ions in various stages of the zeolite preparation procedures has been reported. It has also been reported that zeolites can be modified by treating them with certain metal salt solutions in combination with various pre- and after-treatments to ensure that the zeolites are produced in the most active form. In this respect reference is made to U.S. Pat. No. 4,415,519 issued Nov. 15, 1983, describing a zeolite modification in which a sodium-type Y zeolite is exchanged with the ammonium salt solution, the ammonium exchanged zeolite is calcined, e.g. in a self-steaming condition, and the calcined product is reacted with an acidic aluminum salt solution. Subsequently, the aluminum-exchanged zeolite is again subjected to ammonium-change.

It has been found that zeolitic catalysts with interesting properties can be produced by ion-exchange of low alkali oxide-containing zeolites with certain metal salts, and subsequently, without a calcination treatment, combining the ion-exchanged zeolites with a hydrogenation component of a Group VIII metal and/or a Group VI(b) metal. The catalysts thus prepared are of importance as hydrocracking catalysts.

SUMMARY OF THE INVENTION

The present invention provides a process for the preparation of zeolitic catalysts, which comprises treating a zeolite of the Y-type having an alkali oxide/aluminum oxide molar ratio of at most 0.13 with a solution of multi-valent metal salt having a cationic radius between 0.6 and 1.0 Å and combining the ion-exchanged zeolite with a calcination treatment with a hydrogenation component of a Group VIII and/or Group VI(b) metal.

DETAILED DESCRIPTION OF THE INVENTION

Zeolites of the Y-type having an alkali oxide/aluminum oxide molar ratio of at most 0.13 and in particular a sodium oxide content of at most 2% by weight can suitably be obtained from high alkali oxide containing Y-zeolites by treatment in one or several stages with an ammonium salt solution to reduce the amount of alkali metal to the desired level. Commercially available zeolites, such as Na-Y can be suitably applied as starting materials. Normally, Na-Y zeolites can contain up to about 13.5% by weight of sodium oxide. The treatment(s) with an ammonium salt such as ammonium chloride or ammonium sulphate are well known to those skilled in the art.

It should be noted that the process according to the present invention provides a method for directly preparing a zeolitic catalyst from a low alkali oxide-containing zeolite Y essentially without lowering the unit cell size of the zeolite by calcination after the ion-exchange with a solution of a multi-valent metal salt having a cationic radius between 0.6 and 1.0 Å. Numerical values of the radii of ions may slightly vary, depending on how they are measured. The values used for this specification have been taken from CRC Handbook of Chemistry and Physics, Cleveland, Ohio, 56th ed, 1975–1976, pages F-209 and F-210.

Examples of multi-valent cations which suitably are present in the salts to be used in the process according to the present invention comprise $Ag^{2+}$, $Bi^{3+}$, $Bi^{5+}$, $Ca^{2+}$, $Cd^{2+}$, $Ce^{4+}$, $Co^{2+}$, $Co^{3+}$, $Cr^{2+}$, $Cr^{3+}$, $Cu^{2+}$, $Fe^{2+}$, $Fe^{3+}$, $Ga^{3+}$, $In^{3+}$, $Ir^{4+}$, $Mg^{2+}$, $Mn^{2+}$, $Mn^{3+}$, $Mn^{4+}$, $Mo^{4+}$, $Ni^{2+}$, $Pb^{4+}$, $Pd^{2+}$, $Pd^{4+}$, $Pt^{2+}$, $Pt^{4+}$, $Re^{4+}$, $Rh^{3+}$, $Ru^{4+}$, $Sn^{2+}$, $Sn^{4+}$, $Ta^{5+}$, $Ti^{2+}$, $ti^{3+}$, $Ti^{4+}$, $Tl^{3+}$, $V^{3+}$, $V^{4+}$, $W^{4+}$, $W^{6+}$ and $Zn^{2+}$. Preference is given to the use of metal salts having cationic radii between 0.60 and 0.80 Å, in particular to the appropriate salts of gallium, iron, copper, magnesium, cobalt and nickel. Good results have been obtained using gallium and nickel salts. Salts which can be suitably applied comprise inorganic salts such as nitrates and sulfates as well as the appropriate halides. Preference is given to the use of nitrates and chlorides and in particular to nitrates because of their water solubility which facilitates handling of the materials concerned. It is also possible to use (slightly) soluble salts of organic acids such as formates, acetates and propionates. If desired, mixtures of two or more metal salts can be used in the process according to the present invention.

The amount of metal salts to be used can be varied between wide ranges, depending to some extent on the nature of the metal applied. Normally, solutions containing between 0.005 and 2 moles of metal salt per liter water can be suitably applied, preference being given to concentrations between 0.01 and 1 mole per liter.

The starting zeolite Y material contains at most an alkali oxide/aluminum oxide molar ratio of 0.13, preferably of 0.10, more preferably of 0.05 (which may have been obtained by an ion-exchange treatment of a zeolite Y containing a higher amount of alkali oxide). The starting material is subjected to an ion-exchange with a solution containing the appropriate metal salt(s). The ion-exchange may be carried out by an technique known in the art. If desired the ion-exchange may be repeated a number of times.

The ion-exchange is normally carried out at a relatively low temperature, e.g. at temperatures between 10° and 95° C. Good results have been obtained by carrying out the ion-exchange at a temperature between 20° and 95° C. It will normally be carried out during a time between 15 minutes and 24 hours. Preference is given to a treatment time between 30 minutes and 6 hours.

In the process according to the present invention zeolites having a unit cell size between 24.19 and 24.65 Å can be suitably employed. Preferably, zeolites as described in European Patent Application No. 0 247 678, published May 15, 1987 and European Patent Application No. 0 247 679 published May 15, 1987, are used.

After the ion-exchange with the appropriate metal-ion salt solution, the zeolites thus treated will be normally subjected to drying before being combined with a hydrogenation component. Drying is normally achieved by gentle heating of the material concerned at a temperature ranging from ambient to about 200° C. The drying procedure may be carried out in air or by using an inert gas such as nitrogen. Partial drying is also possible.

A calcination is normally performed at temperatures between 350° and 800° C., and usually between 500° and 750° C., optionally in the presence of steam. The duration of a calcination may vary between wide ranges, from less than 30 minutes to up to 24 hours, depending predominantly on the properties of the zeolite Y as envisaged.

The zeolites are produced by the ion-exchange with the metal salt solution, optionally after drying, are not subjected to the above calcination.

Suitable hydroconversion catalysts comprise apart from one or more zeolites and hydrogenation components, a binder. Binders such as silica, alumina, silica-alumina, clays, zirconia, silica-zironia, titania, silica-boria and mixtures thereof can be suitably applied. Alumina is a preferred binder. Suitably 10–95% w of binder can be used. Preferably, 15–75% w of binder is used.

The ion-exchanged zeolite is combined with a hydrogenation component of a Group VIII and/or Group VI(b) metal. This combining can be carried out by any method known in the art. Preferably this combining is carried out by impregnation and in particular co-mulling. In co-mulling the ion-exchanged zeolite is mixed with the hydrogenating component(s), and optionally a binder, in the presence of water, so that an extrudable paste is obtained. A description of co-mulling can be found in U.S. Pat. No. 3,853,747 issued Dec. 10, 1974.

Preferably, the combining of the ion-exchanged zeolite with the hydrogenation component(s) is carried out by co-mulling the ion-exchanged zeolite, hydrogenation component(s) and binder.

Another preferred embodiment of the present invention is to combine the ion-exchanged zeolite with a mixture of refractory oxides, in particular with a mixture of silica-alumina and alumina. The silica-alumina present will then not only serve as binder but also as amorphous hydroconversion (hydrocracking) component. The weight percentage of zeolite in the combination zeolite/silica-alumina/alumina is preferably from 5–80, the weight percentage of silica-alumina in this combination is preferably from 5–80, the balance being alumina.

The present invention further relates to catalysts comprising a zeolite of the Y-type having an alkali oxide/aluminum oxide of at most 0.13 and multivalent cations with a cationic radius between 0.6 and 1.0 Å at ion-exchangeable positions, and at least one hydrogenation component of a Group VIII metal and/or of a Group VIII metal, obtainable by the above process. Suitably, the catalyst compositions according to the present invention comprise one or more components of nickel and/or cobalt and one or more components of molybdenum and/or tungsten or one or more components of platinum and/or palladium.

The amount(s) of hydrogenation component(s) in the catalyst compositions suitably range between 0.05 and 10 parts by weight (pbw) of Group VIII metal component(s) and between 2 and 40 pbw of Group VI metal component(s), calculated as metal(s) per 100 pbw of total catalyst. The hydrogenation components in the catalyst compositions may be in the oxidic and/or the sulphidic form. If a combination of at least a Group VI and a Group VIII metal component is present as (mixed) oxides, it will be normally subjected to a sulphiding treatment prior to proper use in hydrocracking.

As indicated above, the catalysts preferably comprise further a binder.

The invention further relates to the use of catalyst as described above, in a hydroconversion process, in particular a hydrocracking process.

Further, the invention provides a hydroconversion process in which a hydrocarbonaceous feedstock is contacted with a zeolite catalyst in the presence of hydrogen at hydroconversion conditions, in which the zeolitic catalyst is a catalyst as described hereinbefore.

Feedstocks which can be suitably subjected to a hydroconversion process using catalysts in accordance with the present invention comprise gas oils, deasphalted oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro)treatment steps prior to its use in the hydroconversion process. It is often found convenient to subject the feedstock to a (partial) hydrotreatment. When rather heavy feedstocks are to be processed it may be advantageous to subject such feedstocks to a (hydro)demetallization treatment.

Suitable process conditions for the hydroconversion process comprise temperatures in the range from 250° to 500° C., pressures of up to 300 bar and space velocities between 0.1 and 10 kg feed per liter of catalyst per hour (kg/l.h). Gas/feed ratios of 100 to 5000 Nl/kg feed can suitably be used. Preferably, the hydroconversion process is carried out at a temperature between 300° and 470° C., a pressure between 25 and 200 bar and a space velocity between 0.2 and 5 kg feed per liter of catalyst per hour. Preferably, gas/feed ratios between 250 and 2000 Nl/kg are applied.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The present invention will now be illustrated by means of the following examples which are provided for illustration and are not to be construed as limiting the invention.

EXAMPLE 1

A crystalline zeolite Y as described in European Patent Application No. 0 247 679, having a typical sodium oxide content of 0.1% wt, a sodium oxide/aluminum oxide molar ratio of about 0.011 and a unit cell size of 24.33 Å was subjected to an ion-exchange treatment with a solution (10 ml per gram of crystalline aluminosilicate) of 0.2M gallium nitrate ($Ga^{3+}$ radius: 0.62 Å). The ion-exchange treatment was carried out for one hour under reflux conditions. After filtration, the product obtained was washed and subjected to a drying procedure at 120° C. during 16 hours. The dried zeolite was mixed with hydrated aluminum oxide (boehmite), a solution of nickel nitrate (4.75 g) and ammonium metatungstate (18.82 g calculated as $WO_3$). The resulting mixture was co-mulled for 0.45 hours, and subsequently extruded to produce extrudates. The extrudates were dried for 2 hours at 120° C. and finally calcined for 2 hours at 500° C. The calcined extrudates contained 6.7% wt Ga, 2.6% wt Ni and 8.2% wt W, calculated as metals on total catalyst. The weight ratio of zeolite Y and alumina binder was 4:1.

EXAMPLE 2

A similar procedure as described in Example 1 was carried out using the same type of zeolite Y but a nickel nitrate solution in an amount of 10 ml of 1M nickel nitrate solution per gram of zeolite ($Ni^{2+}$ radius 0.69 Å). After drying of the ion-exchanged zeolite the Ni-containing zeolite (1.3% wt Ni) was subject to the same treatment as described for the Ga-containing zeolite in Example 1, yielding a calcined product containing 3.7% wt Ni and 8.2% wt W, calculated as metals on total catalyst. The weight ratio of zeolite Y and alumina binder was 4:1.

COMPARATIVE EXPERIMENT

A similar procedure was described in Example 1 and 2 was carried out using an aluminum nitrate solution in an amount of 10 ml 1M aluminum nitrate solution per gram of zeolite. The cationic radius of $Al^{3+}$ is 0.51 Å. The resulting catalyst contained 2.6% wt Ni and 8.2% wt W.

EXAMPLE 3

This example shows the advantages of the zeolitic catalysts according to the invention in a hydrocracking process. The catalysts of Examples 1 and 2 (catalysts 1 and 2, respectively) were compared with the catalyst of the Comparative Experiment, catalyst 3, and a catalyst 4 according to European Patent Application No. 0 247 679, i.e. using the same type of zeolite Y, but prepared without the relevant ion-exchange step and prepared by impregnation of calcined compositions of zeolite Y and alumina. Catalyst 4 contained 2.6% wt Ni and 8.2% wt W, based on total catalyst. The weight ratio of the zeolite Y and the alumina binder was 4:1.

The catalyst was tested in a hydrocracking experiment using a hydrocarbon feedstock having the following characteristics:

| C (% wt) | 86.2 |
| --- | --- |
| H (% wt) | 13.8 |
| d (70/4) | 0.826 |
| viscosity (100° C.) | 4.87 cS (ASTM-D-445) |
| viscosity (60° C.) | 12.43 cS (ASTM-D-445) |
| RCT (% wt) | 0.05 (ASTM-D-542) |
| I.B.P. | 205° C. |
| 10/20 | 332/370 |
| 30/40 | 392/410 |
| 50/60 | 428/448 |
| 70/80 | 467/492 |
| 90 | 525 |
| F.B.P. | 598 |

The catalyst was diluted with 0.2 mm SiC particles on a 1:1 volume ratio. The catalyst was then presulphided. The subsequent hydrocracking was carried out under the following operation conditions:

| WHSV | $1.1 \text{ kg} \cdot l^{-1} \cdot h-1$ |
| --- | --- |
| $H_2S$ partial pressure | 1.4 bar |
| total pressure | 130 bar |
| gas/feed ratio | 1,000 $Nlkg^{-1}$. |

The experiment was carried out in once-through operation.

The catalyst performance is expressed as the temperature required to achieve 70% by weight conversion of 300° C.+ material. The results are indicated in Table 1:

TABLE 1

| Experiment No. | 1 | 2 | 3 | 4 |
| --- | --- | --- | --- | --- |
| Catalyst No. | 1 | 2 | 3 | 4 |
| Temperature required (70% wt conversion), °C. | 330 | 325 | 325 | 325 |
| Distribution of 330° C.⁻ product, % wt. | | | | |
| $C_{1-4}$ | 5.8 | 4.2 | 6.1 | 6.1 |
| $C_5 - 130°$ C. | 40.0 | 41.7 | 44.4 | 44.0 |
| 130° C.-300° C. | 53.2 | 47.1 | 49.5 | 49.9 |

From the results it is apparent that the catalysts according to the invention produce less gaseous products ($C_{1-4}$) than the catalysts 3 and 4, whereby catalyst 1 gives an increased middle distillate yield and catalyst 2 gives an enhanced naphtha yield. From comparison between catalysts 3 and 4 it is apparent that when the ion-exchange is carried out with the $Al^{3+}$ ion, having a too small ionic radius, the performance of the resulting catalyst hardly changes in comparison with a catalyst prepared without the present ion-exchange step.

EXAMPLE 4

A Ni-containing zeolite Y obtained after ion-exchange and drying as in Example 2, was mixed with silica-alumina (weight ratio $SiO_2:Al_2O_3 = 3:1$), alumina and nickel nitrate solution and molybdenum trioxide. After co-mulling, extrusion, drying and calcination a catalyst was obtained comprising 12.9% wt Mo and 8.2% wt Ni, whereby the weight ratio zeolite Y/silica-alumina/alumina was 30:40:30.

EXAMPLE 5

Catalyst 5 (the catalyst of Example 4) was compared with a catalyst 6 prepared to European Patent Application No. 0 247 678, i.e. by mixing a zeolite Y with silica-alumina (weight ratio $SiO_2:Al_2O_3 = 3:1$) and alumina, extruding the mixture to yield extrudates, drying and calcining the extrudates and depositing Ni and Mo upon the extrudates by impregnation. Catalyst 6 contained 7.8% wt Ni, 12.9% wt Mo and the weight ratio zeolite Y/silica-alumina/alumina was 30:40:30.

The catalysts were subjected to a hydrocracking process in which the following feedstocks were employed.

| Feedstock I | | Feedstock II | |
| --- | --- | --- | --- |
| C (% wt) 86.4 | | C (% wt) 86.4 | |
| H (% wt) 13.6 | | H (% wt) 13.6 | |
| N (ppmw) 4 | | N (ppmw) 12 | |
| Boiling characteristics, °C. | | Boiling characteristics, °C. | |
| 2/10 | 290/328 | 2/10 | 287/353 |
| 20/30 | 368/396 | 20/30 | 384/407 |
| 40/50 | 420/440 | 40/50 | 426/444 |
| 60/70 | 460/482 | 60/70 | 460/481 |
| 80/90 | 508/542 | 80/90 | 505/539 |

-continued

| Feedstock I | Feedstock II |
|---|---|
| 540+° C., (% wt) 10.5 | 540+° C., (% wt) 9.8 |

The temperature required to get a 56% wt conversion was determined as well as the product distribution. After having run for 125 hours on feedstock I, the feedstock was changed and feedstock II was used. The product distribution and the temperature required to get a 56% wt conversion after having run for 200 hours on feedstock II was determined, too. The process conditions were a total pressure of 125 bar, a $H_2S$ partial pressure of 2.4 bar, a space velocity of 0.75 kg/l.hr and a gas/feedstock ratio of 1500 Nl/kg. The results are shown in Table II.

TABLE II

| Experiment No. | 5 | 6 |
|---|---|---|
| Catalyst No. | 5 | 6 |
| Feedstock I | | |
| T required, °C. | 323 | 312 |
| Product distribution, % wt | | |
| $C_{1-14}$ | 4 | 6 |
| $C_5 - 130°$ C. | 32 | 31 |
| 130-300° C. | 64 | 63 |
| Feedstock II | | |
| T required, °C. | 325 | 326 |
| $C_{1-4}$ | 4 | 4 |
| $C_5 - 130°$ C. | 27 | 32 |
| 130-300° C. | 69 | 64 |

From the above results it is apparent that at low nitrogen content the selectivity of the catalyst 5 to $C_{1-4}$ hydrocarbons is smaller than that of the prior art catalyst. Further the nitrogen sensitivity, as defined as the temperature difference required to obtain a 56% wt conversion at 4 and at 12 ppmw N, is for catalyst 6 significant, whereas the N sensitivity of catalyst 5 is small.

What is claimed is:

1. A process for the preparation of a zeolitic catalyst which comprises treating at a temperature between 10° and 95° C. a zeolite of the Y-type having an alkali metal/aluminum oxide molar ratio of at most 0.13 with a solution of a gallium or nickel nitrate or chloride having a molarity between 0.005 and 2, subjecting the ion-exchanged zeolite to a drying treatment at a temperature up to 200° C. and combining the dried ion-exchanged zeolite without a calcination step with a hydrogenation component selected from the group consisting of nickel, cobalt, tungsten, molybdenum, platinum, palladium and mixtures thereof.

2. The process according to claim 1 wherein the dried ion-exchanged zeolite is combined with the hydrogenation component(s) by impregnation.

3. The process according to claim 1 wherein the dried ion-exchanged zeolite is combined with the hydrogenation component(s) and a binder selected from silica-alumina or alumina by co-mulling.

4. A catalyst comprising a zeolite of the Y type having an alkali oxide/aluminum oxide molar ratio of a most 0.13 and a mutivalent cation(s) with a cationic radius between 0.6 and 1.0 Å at ion-exchangeable positions, and at least one hydrogenation component of a Group VIII and/or Group VI(b) metal, obtainable by the process according to claim 1.

5. The catalyst according to claim 4, wherein the hydrogenation components have been selected from the group consisting of nickel, cobalt, tungsten, molybdenum, platinum and palladium components.

6. The catalyst according to claim 5 which further comprises a binder.

* * * * *